Figure 1:
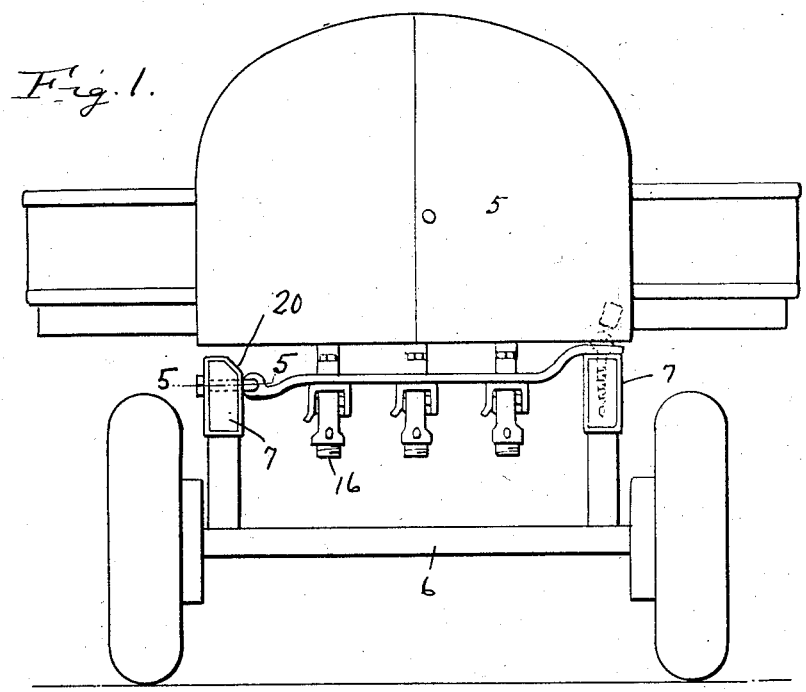

May 24, 1932.  R. W. HYNDMAN  1,860,288
OIL TANK FAUCET BAR LOCK
Filed Aug. 28, 1930  2 Sheets-Sheet 1

Inventor
Ross W. Hyndman
By Clarence A. O'Brien
Attorney

May 24, 1932.  R. W. HYNDMAN  1,860,288
OIL TANK FAUCET BAR LOCK
Filed Aug. 28, 1930  2 Sheets-Sheet 2

Inventor

Ross W. Hyndman

By Clarence A. O'Brien
Attorney

Patented May 24, 1932

1,860,288

UNITED STATES PATENT OFFICE

ROSS W. HYNDMAN, OF DES MOINES, IOWA

OIL TANK FAUCET BAR LOCK

Application filed August 28, 1930. Serial No. 478,451.

The present invention relates to a lock for the faucets of an oil tank such as is commonly mounted on an automobile truck chassis and the prime object of the invention is to provide a bar mounted so that the same may be swung over the faucet and having means to straddle the faucet in such a manner as to prevent operation thereof by unauthorized persons.

Another very important object of the invention resides in the provision of an oil tank faucet lock structure of this nature which is exceedingly simple, easy to manipulate, inexpensive to manufacture and install, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
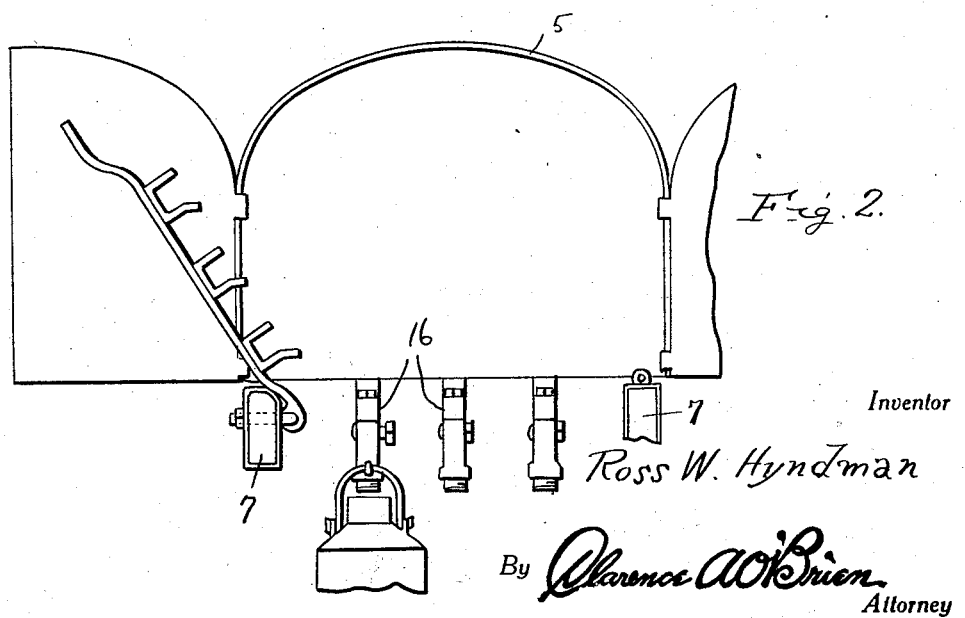
Figure 3:
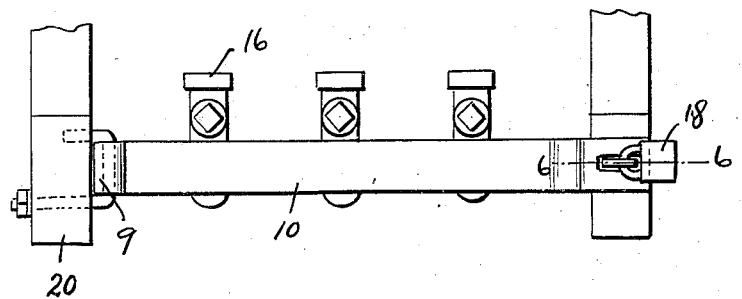
Figure 4:
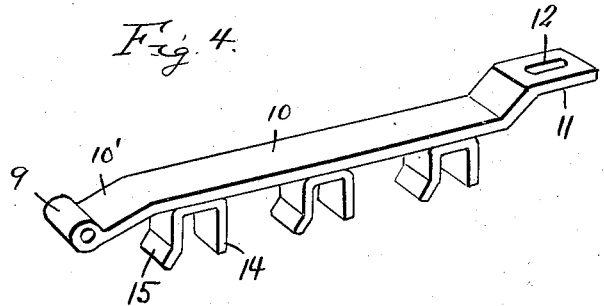
Figure 5:
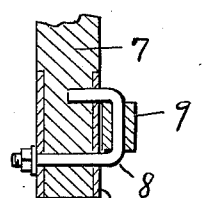
Figure 6:
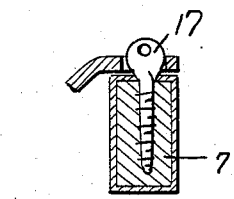

In the drawings:

Figure 1 is a rear elevation of a tank structure showing my improved lock features incorporated therewith, Figure 2 is a somewhat similar view showing the lock structure in an open position, Figure 3 is a top plan view of the lock structure, Figure 4 is a perspective view of the bar, Figure 5 is a sectional view taken substantially on the line 5—5 of Figure 1, and Figure 6 is a sectional view taken substantially on the line 6—6 of Figure 3.

Referring to the drawings in detail it will be seen that the numeral 5 denotes a tank on an automobile chassis 6 which includes longitudinal beams 7. On the rear extremities of these beams are mounted my improved lock structure. On one extremity is mounted a U-bolt 8 having one leg longer than the other and its bight portion journalled through a bearing 9 of an elongated bar 10 thereby hingedly mounting the bar 10. The free end of the bar 10 is offset as indicated at 11 and has a slot 12 therein. On the bar 10 are a plurality of U-shaped clips 14 one extremity 15 of each clip diverging outwardly from the other extremities. These clips are adapted to straddle the faucets 16 so as to prevent access to the heads thereof which are usually operated by wrenches. On the extremity of the other side beams there is an eye bolt 17, the eye portion of which is adapted to extend through the slot 12 when the bar 10 is in its position as shown in Figures 1 and 3 so that a padlock 18 or the like may be engaged therewith to prevent the lifting or upward swinging of the bar 10. By unlocking the padlock and removing the same the bar 10 may be swung to the position shown in Figure 2 and in order that it may be placed in an upwardly and sidewardly inclined position, a portion 10' of the bar 10 is at an angle thereto adjacent the bearing 9 to rest on the beveled portion 20 of the extremity of the side beam 7 having the U-bolt 8 therein.

It is thought that the construction, utility, operation, and advantages of this invention will now be quite apparent to those skilled in this art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A locking device of the class described comprising a bar, a number of inverted U-shaped members fastened to one face of the bar, one limb of each member flaring outwardly from the other limb and of greater length than said other limb.

In testimony whereof I affix my signature.

ROSS W. HYNDMAN.